I. C. POPPER.
DETACHABLE HANDLE.
APPLICATION FILED NOV. 2, 1917.

1,270,206.

Patented June 18, 1918.

Witness
Philip E. Barnes

Inventor
Isaac C. Popper
By Vernon E. Hodges
his Attorney

UNITED STATES PATENT OFFICE.

ISAAC C. POPPER, OF NEW YORK, N. Y.

DETACHABLE HANDLE.

1,270,206.   Specification of Letters Patent.   Patented June 18, 1918.

Application filed November 2, 1917. Serial No. 199,879.

*To all whom it may concern:*

Be it known that I, ISAAC C. POPPER, a citizen of the United States of America, residing at New York, in the county of New York and State of New York, have invented certain new and useful Improvements in Detachable Handles, of which the following is a specification.

My invention relates to an improvement in detachable handles particularly adapted for handling hot culinary appliances, it being constructed and adapted to this one particular purpose and to this end it consists in two members pivoted together after the manner of a pair of pliers, one member having a hook at the end which takes over and fits the beaded edge of a cooking utensil or other article to be lifted or held, and the other member having a pair of jaws which coöperate with the hook and which engage the outer surface of the receptacle adjacent to and within the space bounded by the hook forming a rest or support which insures a firm hold upon the utensil.

In the accompanying drawings Figure 1, is a view in perspective showing my improved device attached to the beaded edge of the utensil.

Figure 1:
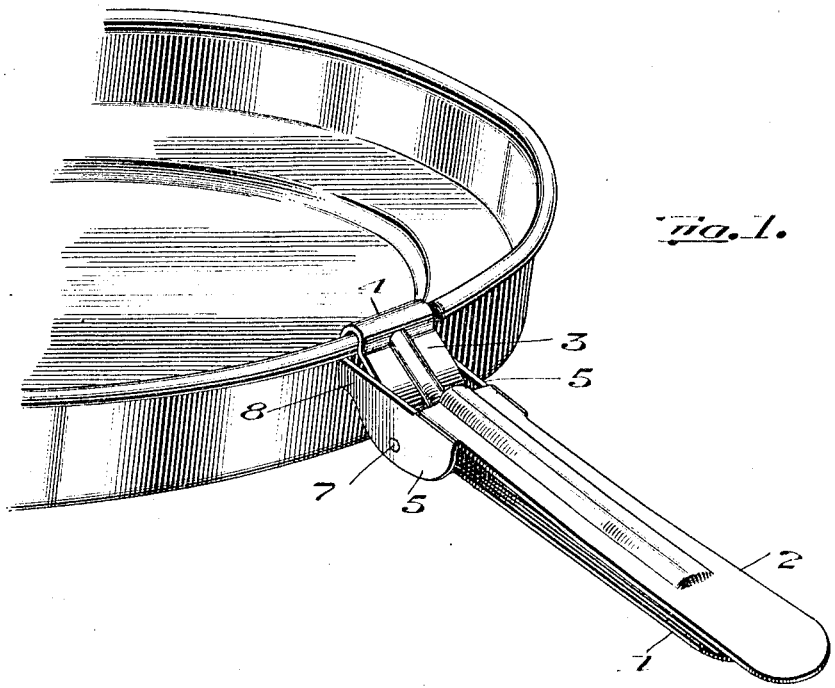
Figure 2:
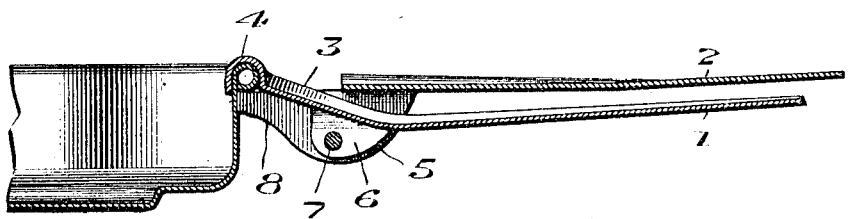
Fig. 2, is a longitudinal sectional view.
Figure 3:
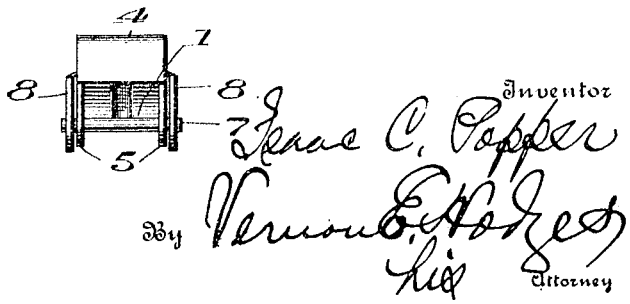
Fig. 3, is a view in end elevation.

My improved holder is preferably stamped out of two pieces of sheet metal such, for instance, as aluminum in order to make it light and this article is primarily intended to be used as a detachable handle for the parts of a portable cooking apparatus set forth in an application filed concurrently with this.

This holder is composed of two members 1 and 2, each of which is extended at one end to form a handle. Member 1, may be bent at 3, at a slight angle and its extreme end is then bent sharply at approximately right angles, thence curved around to form a hook 4 in the form of and adapted to conform to the beaded edge of a cooking utensil such as indicated, and the end of the hook is somewhat extended to form a broad bearing upon the inner surface of the cooking utensil which assists in gripping the utensil to be held.

The other member 2, terminates in a pair of jaws 5, through which, and through ears 6, in the other member the pin or pintle 7, passes, as a means of pivoting the two members together.

The extreme outer ends 8 of the jaws terminate approximately at a right angle and their function is to coöperate with the hook by engaging the surface of the receptacle on the outside and just below the beading so that while the hook approximately conforms to and embraces the beading throughout a large portion of its transverse area, at the same time the extreme ends of the jaws embrace the body of the receptacle from the outside immediately beneath the bead, thus making a perfect handle which fits more or less tightly and which is capable of being easily and quickly applied or removed and which can be used in either lifting a hot article from the stove or flame or in tilting it or shaking it, if desired, by grasping both handles or handle 2 only as the utensil is lifted and held by the fulcrum created due to the pressure of the extreme ends of the jaws 8 upon the outer surface of the utensil adjacent to the bead and the embrasure of the hook around the bead and on the inner wall of the cooking utensil.

The jaws straddle the member having the hook and the two handles are adapted to come together or approximately together when the handle is in gripping position.

In this way a simple, light and inexpensive article is provided for the purpose, thus saving the fingers of the operator.

I claim:

As an article of manufacture, a detachable handle comprising two members pivoted together, one terminating in a hook which conforms to and embraces the upper and inner beaded edge of the article to be held, and the other member terminating in two jaws, which approximately cross or intersect the hook and terminate in abrupt ends adjacent to the end of the hook and a distance therefrom approximately equivalent to the thickness of the metal in the utensil, and made to engage and fulcrum upon the outer surface of the utensil at a point adjacent to the bead and within the compass of the hook, whereby bearing is had not only upon the bead but upon the adjacent outer surface of the utensil so that a rigid grip is provided upon the article to be held when one or both handles are grasped.

In testimony whereof I affix my signature.

ISAAC C. POPPER.